Jan. 2, 1951     A. V. MONTGOMERY     2,536,563
BOAT TRAILER AND LOADING AND UNLOADING MEANS THEREFOR
Filed Oct. 30, 1947     3 Sheets-Sheet 1
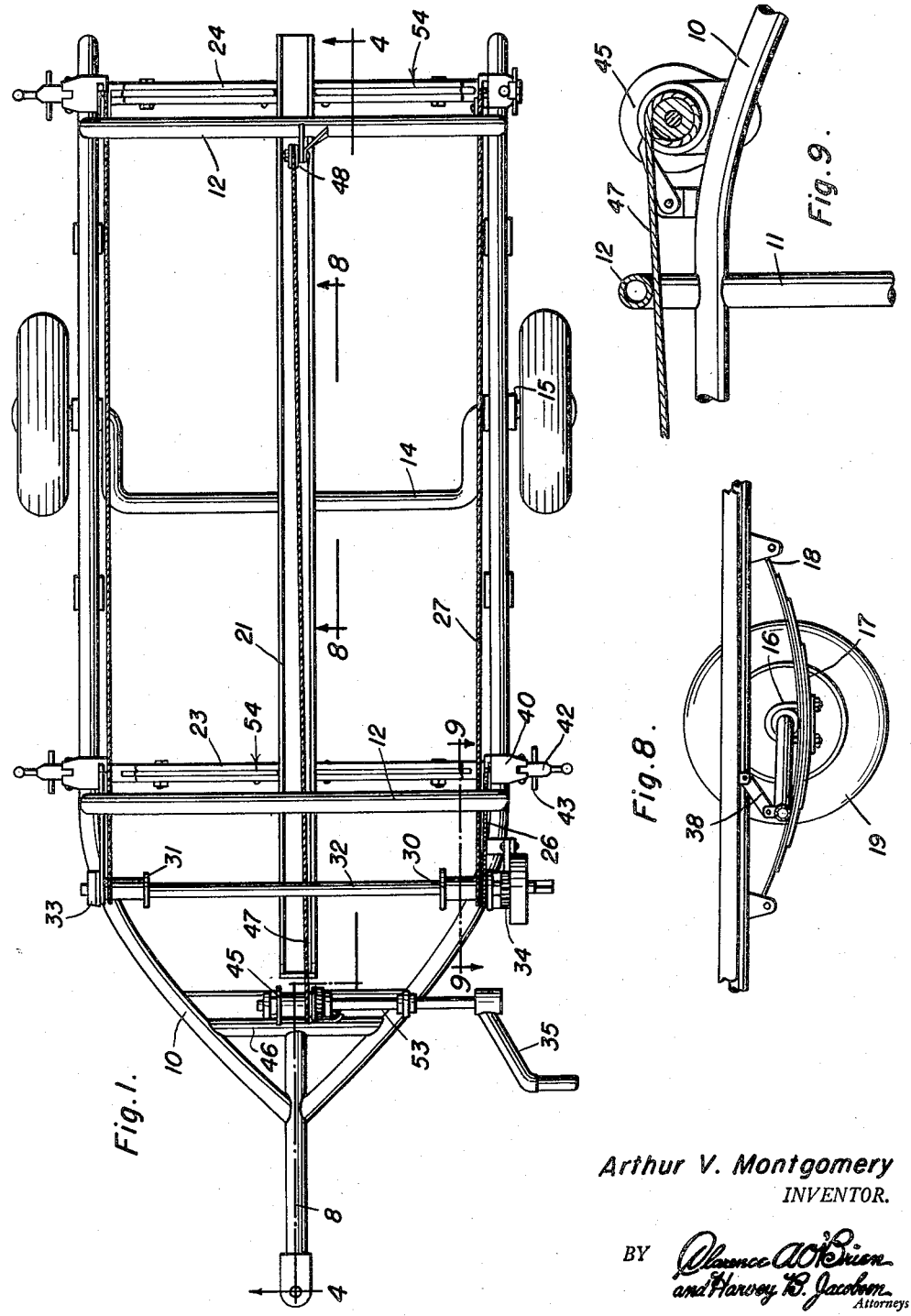
Arthur V. Montgomery
INVENTOR.
BY *Clarence A. O'Brien*
*and Harvey B. Jacobson*
Attorneys Jan. 2, 1951     A. V. MONTGOMERY     2,536,563
BOAT TRAILER AND LOADING AND UNLOADING MEANS THEREFOR
Filed Oct. 30, 1947     3 Sheets-Sheet 2
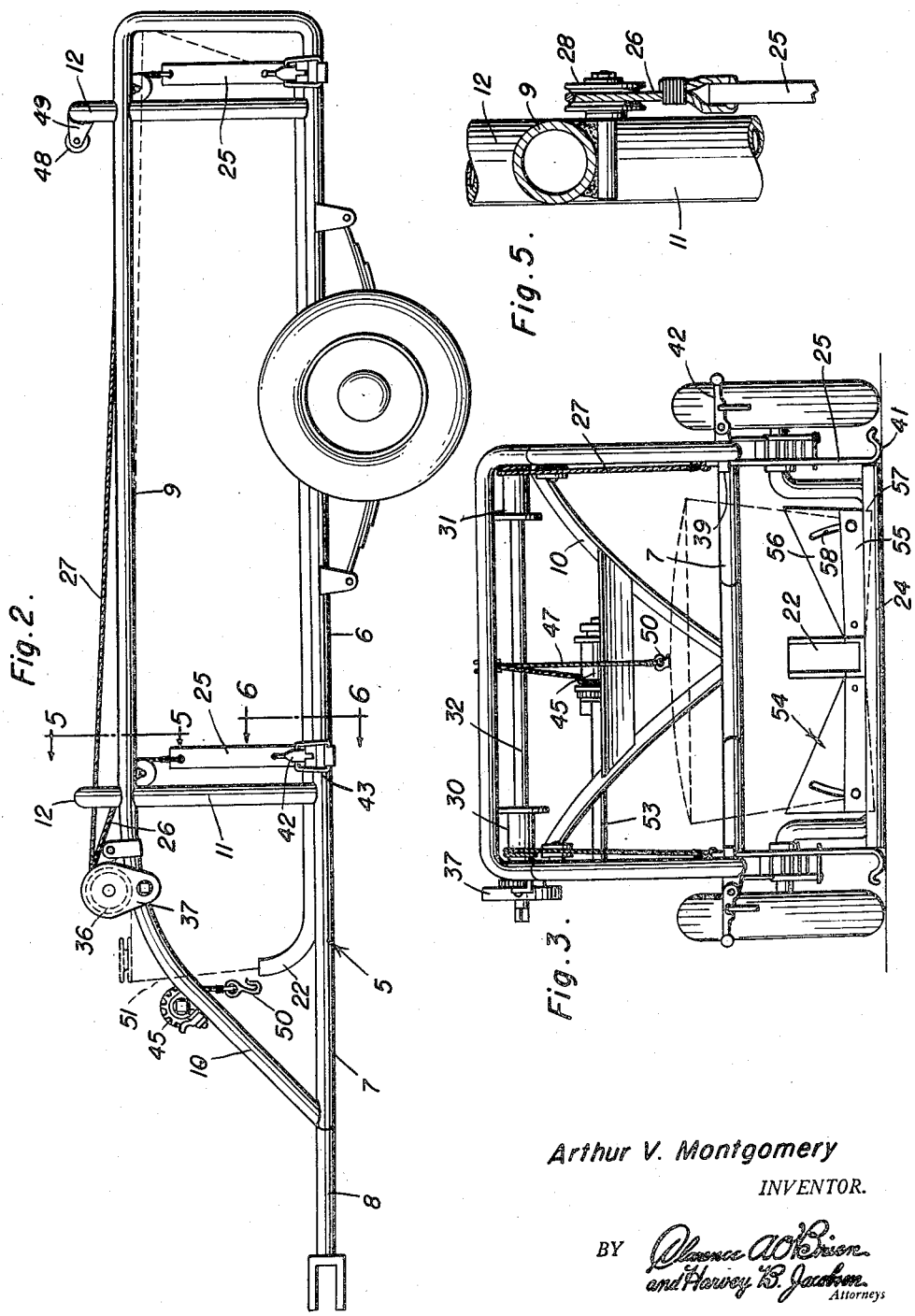
Arthur V. Montgomery
INVENTOR.

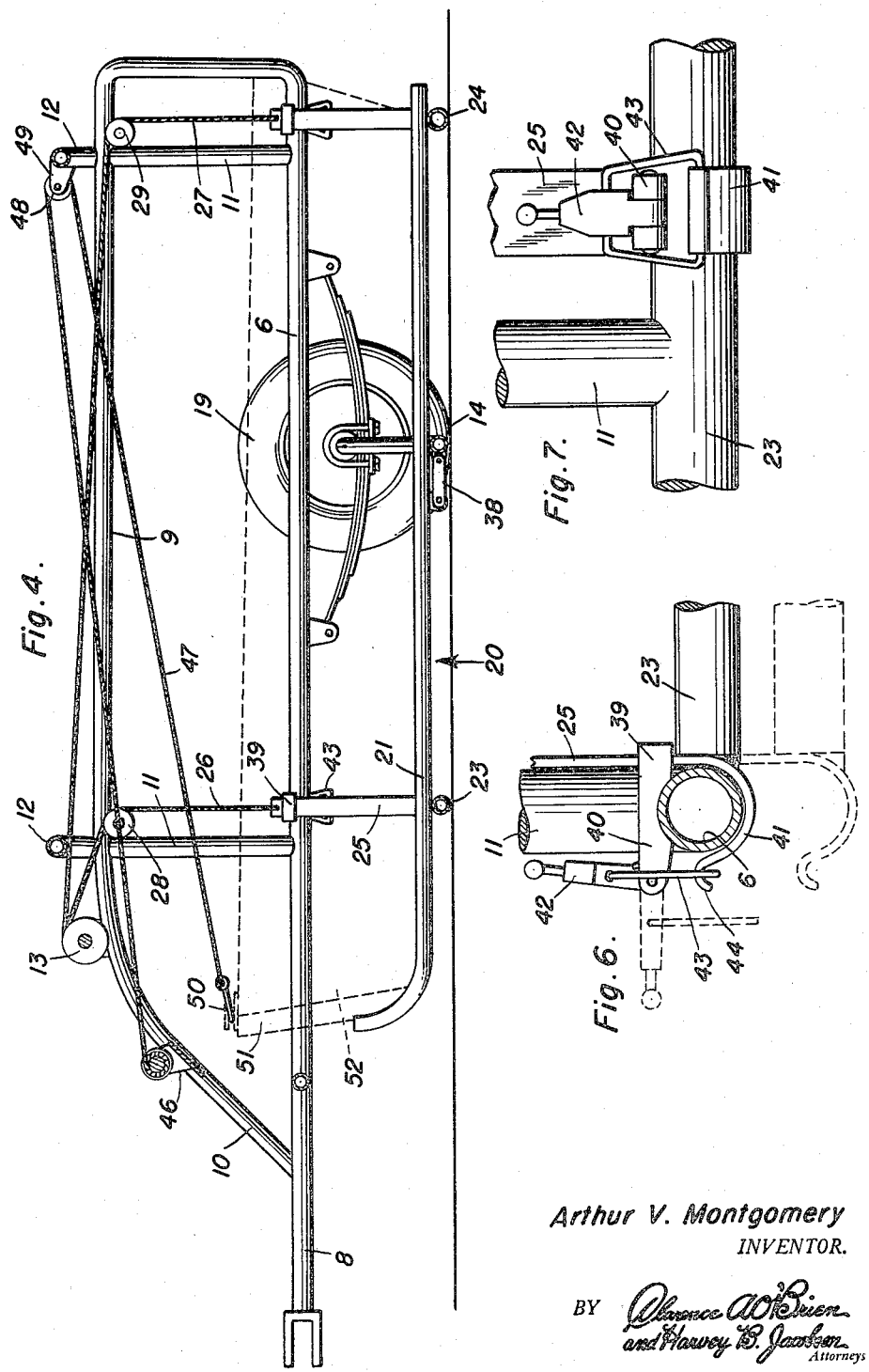

Patented Jan. 2, 1951

2,536,563

UNITED STATES PATENT OFFICE 2,536,563

BOAT TRAILER AND LOADING AND UNLOADING MEANS THEREFOR

Arthur V. Montgomery, Sinton, Tex.

Application October 30, 1947, Serial No. 783,045

8 Claims. (Cl. 214—65)

The present invention relates to new and useful improvements in boat trailers and more particularly to means for loading and unloading a boat on the trailer.

An important object of the present invention is to provide a boat cradle including a full keel support for a boat to keep the keel from sagging while supported on the trailer.

A further object of the invention is to provide means for raising and lowering the boat cradle while loading and unloading the boat on the trailer.

A still further object of the invention is to provide winch means for sliding a boat onto the boat cradle for loading the boat thereon in shallow water and also for sliding the boat off of the cradle for unloading the same into shallow water.

A still further object is to provide a boat trailer of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view;

Figure 2 is a side elevational view;

Figure 3 is a rear elevational view;

Figure 4 is a longitudinal sectional view taken on a line 4—4 of Figure 1;

Figure 5 is an enlarged fragmentary sectional view taken on a line 5—5 of Figure 2;

Figure 6 is a similar view taken on a line 6—6 of Figure 2 and showing the locking means for the cradle lifting strap;

Figure 7 is a side elevational view of the cradle locking means; and,

Figures 8 and 9 are fragmentary longitudinal sectional views taken respectively on the lines 8—8 and 9—9 of Figure 1.

Referring now to the drawings in detail wherein for the purpose of illustration I have disclosed a preferred embodiment of the invention the numeral 5 designates the trailer frame generally and which is preferably constructed of longitudinally extending tubular frame members 6 converging at their front ends as shown at 7 and provided with a tongue 8 for towing the trailer. Side rails 9 are formed by bending the rear ends of the longitudinal frame members 6 upwardly and forwardly above said frame members and inclining the front ends of the rails to join with the frame members as shown at 10 and welding the same thereto. Posts 11 support the front and rear ends of the rails on the frame members.

Inverted U-shaped cross frame members 12 have their lower ends welded to the rails 9 immediately above the posts 11.

A U-shaped or crank axle 14 is formed with outwardly extending ends 15 pivotally supported in spring saddles 16 at the central portion of leaf springs 17 which have their ends secured to the underside of the frame member 6 by conventional shackles or brackets 18. The central portion of the axle 14 is swingable vertically substantially in the arc of the outer periphery of wheels 19 journaled on the axle extensions 15 whereby the central portion of the axle may be lowered on the ground when loading a boat on the trailer.

A boat cradle designated generally at 20 includes a channel-shaped keel 21 extending longitudinally at the center of the frame 5, the front end of the keel support or seat 21 being curved upwardly as shown at 22. Front and rear cross braces 23 and 24 extend transversely under the keel support 21 and are welded or otherwise suitably secured thereto.

To the outer ends of the cross braces 23 and 24 are welded or otherwise suitably secured the lower ends of metal lifting straps 25, the upper ends of the front and rear lifting straps having cables 26 and 27 attached respectively thereto and are trained over front and rear pulleys 28 and 29 secured respectively to the front and rear portions of rails 9.

The cables 26 and 27 at each side of the frame are attached to drums 30 and 31 suitably secured to the opposite ends of a transverse shaft 32 for winding the cables on the drums. The shaft 32 is supported in bearings 33 suitably secured to the front ends of the side rails 9.

The drum 30 at one end of the shaft 32 is provided with a conventional pawl and ratchet mechanism 34 and the shaft is rotated by means of a detachable crank handle 35 through reduction gearings 36 enclosed in a housing 37.

In the operation of the device the boat cradle 20 including the keel support 21 and cross braces 23 and 24 is raised and lowered between the longitudinal frame members 6 of the frame 5 by means of the cables 26 and 27 and drums 30 and 31.

The central portion of the axle 14 is connected to the keel support 21 by a pivoted link 38 for raising and lowering the axle with the boat cradle 20.

The lifting straps 25 are slidable in guides 39 projecting inwardly from brackets 40 welded or otherwise secured to the frame members 6 and the lower ends of the straps 25 are formed with outwardly extending hooks 41 for engaging under the frame members 6 as shown in Figure 6 of the drawings.

A locking handle 42 is pivoted to the outer end of bracket 40 to which is pivotally secured the upper end of a metal loop 43 for engaging under a lip 44 on the outer end of hook 41 whereby to lock the hook and strap 25 in a raised position under the frame members 6 by a raising movement of the handle 42 and thus secure the boat cradle 20 to the main frame 5 of the trailer while transporting a boat supported thereon.

In order to load and unload a boat on the boat cradle in shallow water I provide a drum 45 suitably supported on a bracket 46 carried by the downwardly inclined ends 10 of the upper rails 9 and to the drum is attached one end of a cable 47 which extends rearwardly over a pulley 48 journaled on a bracket 49 suitably secured to the rear bow member 12, the free end of the cable 47 then extending forwardly and provided with a hook 50 for attaching to the bow portion 51 of a boat 52 when resting on the cradle 20 to slide the boat rearwardly from the cradle by the operation of the drum 45. The drum 45 includes a shaft 53 projecting from one side thereof and to which the crank handle 35 may be attached.

When it is desired to load the boat 52 onto the cradle 20 the cable 47 is removed from the pulley 48 and the hook 50 attached to the bow 51 of the boat which is then pulled forwardly on the cradle 20 by the operation of the drum 45.

Chocks 54 include a lower fixed section 55 welded or otherwise suitably secured on top of the cross braces 23 and 24 and a vertically adjustable upper section 56 pivoted at their inner ends to the fixed sections and vertically swingable at their outer ends to adjust the chocks to the hull of the boat. The upper sections of the blocks are secured in vertically adjusted position by set screws 57 carried by the lower section working in arcuate slots 58 in the upper section.

The drums 30 and 31 are double grooved to prevent fouling of cables 26 and 27 with each other.

In view of the forgoing description taken in conjunction with the accompanying drawings it is believed that a clear understanding of the construction, operation and advantages of the device will be quite apparent to those skilled in this art. A more detailed description is accordingly deemed unnecessary.

It is to be understood however that even though there is herein shown and described a preferred embodiment of the invention the same is susceptible to certain changes fully comprehended by the spirit of the invention as herein described and the scope of the appended claims.

Having described the invention, what is claimed as new is:

1. A boat trailer comprising a trailer frame, a boat cradle positioned within the frame, hoisting means for the cradle carried by the frame and including metal straps at each side of the cradle, means locking the straps to the frame to hold the cradle in a raised position, said locking means comprising hooks on the straps engaging the underside of the frame, and swingable bails carried by the frame and holding said hooks upwardly against the frame.

2. A boat trailer comprising a trailer frame, wheels mounted at the sides of the frame, an axle pivoted adjacent its end portions to the frame and having a central crank portion, a boat cradle positioned between the sides of the frame, a hoist carried by the frame, including cables attached to each side of the cradle for raising and lowering the cradle, and means connecting the crank portion of the axle to the cradle for raising and lowering movement therewith.

3. A boat trailer comprising a trailer frame, a boat cradle positioned between the sides of the frame and including a centrally disposed channel shaped keel support and cross bars extending outwardly at each side of the keel support, metal lift bars rising from the ends of said cross bars, and hoisting means carried by the frame and including cables attached to said lift bars.

4. A boat trailer comprising a trailer frame, a boat cradle positioned between the sides of the frame and including a centrally disposed channel shaped keel support and cross bars extending outwardly at each side of the keel support, metal lift bars rising from the ends of said cross bars, guides on the frame for said lift bars, and hoisting means carried by the frame and including cables attached to said lift bars.

5. A boat trailer comprising a trailer frame, a boat cradle positioned between the sides of the frame and including a centrally disposed keel support and cross bars extending outwardly at each side of the keel support, metal lift bars rising from the ends of said cross bars, and having hooks at their lower ends, guides on the frame for said lift bars, hoisting means carried by the frame and including cables attached to said lift bars to raise the cradle into a position with the hooks engaging the underside of the frame, and means locking the lift bars to the frame.

6. A boat trailer comprising a trailer frame, a boat cradle positioned between the sides of the frame and including a centrally disposed keel support and cross bars extending outwardly at each side of the keel support, metal lift bars rising from the ends of said cross bars, and having hooks at their lower ends, guides on the frame for said lift bars, hoisting means carried by the frame and including cables attached to said lift bars to raise the cradle into a position with the hooks engaging the underside of the frame, and means locking the lift bars to the frame, said last named means comprising swingable bails engaging the hooks to hold the hooks upwardly against the frame.

7. A boat trailer comprising a trailer frame, a boat cradle positioned within the frame, hoisting means carried by the frame for raising and lowering the cradle, said cradle including a longitudinally extending channel shaped keel support and cross supports extending outwardly from opposite sides of the keel support, and adjustable chocks carried by the cross supports for engaging under the hull of a boat resting in the cradle.

8. A boat trailer comprising a trailer frame, a boat cradle positioned within the frame, hoisting means carried by the frame for raising and lowering the cradle, said cradle including a longitudinally extending channel shaped keel support and cross supports extending outwardly from opposite sides of the keel support, and adjustable chocks carried by the cross supports for engaging under the hull of a boat resting in the cradle, said chocks including a vertically swingably chock element and means securing the same in vertically adjusted position.

ARTHUR V. MONTGOMERY.

REFERENCES CITED

The following references are of record in the file of this patent:

UNITED STATES PATENTS

| Number | Name | Date |
| --- | --- | --- |
| 1,598,844 | Baxter | Sept. 7, 1926 |
| 1,798,412 | Grab | Mar. 31, 1931 |
| 2,028,442 | Dormer | Jan. 21, 1936 |
| 2,156,183 | King | Apr. 25, 1939 |
| 2,211,083 | Smith | Aug. 13, 1940 |
| 2,240,564 | Le Tourneau | May 6, 1941 |
| 2,361,951 | Livermon | Nov. 7, 1944 |
| 2,389,338 | Zorc, Jr. | Nov. 20, 1945 |
| 2,444,231 | Sanford | June 29, 1948 |
| 2,448,119 | Peterson | Aug. 31, 1948 |